(12) United States Patent
Zhao et al.

(10) Patent No.: US 6,921,586 B2
(45) Date of Patent: Jul. 26, 2005

(54) NI-BASE SUPERALLOY HAVING A COATING SYSTEM CONTAINING A DIFFUSION BARRIER LAYER

(75) Inventors: Ji-Cheng Zhao, Latham, NY (US); Jeffrey Allan Pfaendtner, Blue Ash, OH (US); Christine Govern, Cincinnati, OH (US); Melvin Robert Jackson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 60 days.

(21) Appl. No.: 10/605,860

(22) Filed: Oct. 31, 2003

(65) Prior Publication Data

US 2004/0142204 A1 Jul. 22, 2004

Related U.S. Application Data

(63) Continuation-in-part of application No. 09/683,700, filed on Feb. 5, 2002, now Pat. No. 6,720,088.

(51) Int. Cl.$^7$ .............................................. B32B 15/01
(52) U.S. Cl. ................. 428/670; 428/632; 428/652; 428/666; 428/667; 428/680; 428/686; 428/926
(58) Field of Search ............................... 428/670, 632, 428/652, 666, 667, 680, 686, 926

(56) References Cited

U.S. PATENT DOCUMENTS 5,482,789 A * 1/1996 O'Hara et al. .............. 428/652
6,720,088 B2 * 4/2004 Zhao et al. ................. 428/670

* cited by examiner

*Primary Examiner*—Robert R. Koehler
(74) *Attorney, Agent, or Firm*—David L. Narciso; Gary M. Hartman; Domenica N. S. Hartman

(57) ABSTRACT

A coating system for an article comprising a substrate formed of a metal alloy that is prone to the formation of a deleterious secondary reaction zone (SRZ) as a result of containing more than three weight percent rhenium and at least one additional refractory metal. The coating system comprises an aluminum-containing overlay coating and a diffusion barrier coating between the overlay coating and the substrate. The diffusion barrier coating consists of, in atomic percent, about 20% to about 90% ruthenium, about 2% to about 60% chromium, optionally up to about 50% aluminum, optionally up to about 20% of a platinum-group metal, and the balance at least one of nickel, cobalt, and iron and incidental impurities. The diffusion barrier coating sufficiently inhibits diffusion of aluminum from the overlay coating into the substrate, such that the substrate remains essentially free of SRZ.

20 Claims, 2 Drawing Sheets

NI-BASE SUPERALLOY HAVING A COATING SYSTEM CONTAINING A DIFFUSION BARRIER LAYER

CROSS REFERENCE TO RELATED APPLICATIONS

This is a continuation-in-part patent application of co-pending U.S. patent application Ser. No. 09/683,700, filed Feb. 5, 2002 now U.S. Pat. No. 6,720,088 B2.

FEDERAL RESEARCH STATEMENT

This invention was made with Government support under Agreement No. N00019-96-C-0176. The Government has certain rights in the invention.

BACKGROUND OF INVENTION

1. Field of the Invention

The present invention generally relates to protective coating systems for components exposed to high temperatures, such as the hostile thermal environment of a gas turbine engine. More particularly, this invention relates to a coating system that inhibits the formation of deleterious phases in the surface of a superalloy that is prone to coating-induced metallurgical instability.

2. Description of the Related Art

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through the formulation of nickel and cobalt-base superalloys. Nonetheless, when used to form components of the turbine, combustor and augmentor sections of a gas turbine engine, such alloys alone are often susceptible to damage by oxidation and hot corrosion attack and/or may not retain adequate mechanical properties. For this reason, these components are often protected by an environmental coating and/or a thermal barrier coating (TBC) system, the latter of which typically includes an environmentally-protective metallic bond coat and a thermal-insulating ceramic topcoat, referred to as the TBC.

Environmental coatings and TBC bond coats are often formed of an oxidation-resistant aluminum-containing alloy or intermetallic. An example of the former is MCrAlX (where M is iron, cobalt and/or nickel, and X is yttrium or another rare earth element), which is deposited as an overlay coating. An example of the latter includes diffusion coatings, particular diffusion aluminides and platinum-aluminides (PtAl) that contain aluminum intermetallics (e.g., NiAl). Other types of environmental coatings and bond coats that have been proposed include beta-phase nickel aluminide (NiAl) overlay coatings. In contrast to the aforementioned MCrAlX overlay coatings, which are metallic solid solutions containing intermetallic phases, the NiAl beta phase is an intermetallic compound that exists for nickel-aluminum compositions containing about 30 to about 60 atomic percent aluminum. Notable examples of beta-phase NiAl coating materials are disclosed in commonly-assigned U.S. Pat. No. 5,975,852 to Nagaraj et al., U.S. Pat. No. 6,153,313 to Rigney et al., U.S. Pat. No. 6,255,001 to Darolia, and U.S. Pat. No. 6,291,084 to Darolia et al. These NiAl compositions, which preferably contain a reactive element (such as zirconium and/or hafnium) and/or other alloying constituents (such as chromium), have been shown to improve the adhesion of a ceramic TBC, thereby increasing the spallation resistance of the TBC. These same compositions can also be used alone as environmental coatings for superalloy components that do not require the thermal protection of a TBC.

The above-noted coating materials contain relatively high amounts of aluminum relative to the superalloys they protect. Conversely, superalloys contain various elements, including refractory elements, that are not present or are present in relatively small amounts in these coatings. When bond coats and environmental coatings of the type described above are deposited on a superalloy substrate, a primary diffusion zone of chemical mixing occurs to some degree between the coating and the superalloy substrate as a result of the concentration gradients of the constituents. At elevated temperatures, further interdiffusion occurs as a result of solid-state diffusion across the substrate/coating interface. The migration of elements across this interface alters the chemical composition and microstructure of both the coating and the substrate in the vicinity of the interface, generally with deleterious results. For example, migration of aluminum out of the coating reduces its oxidation resistance, while the accumulation of aluminum in the substrate beneath the coating can result in the formation of topologically close-packed (TCP) phases that, if present at sufficiently high levels, can drastically reduce the load-carrying capability of the alloy.

Certain high strength superalloys contain significant amounts of refractory elements, such as rhenium, tungsten, tantalum, hafnium, molybdenum, niobium, and zirconium, which are all components of TCP phases. If these elements are present in sufficient amounts or combinations (particularly rhenium at levels exceeding four weight percent and potentially as low as three weight percent), a detrimental type of diffusion zone containing deleterious TCP phases can form following deposition of an aluminum-containing coating. This detrimental diffusion zone, which has been termed a secondary reaction zone (SRZ), is the result of a cellular reaction that can be characterized by a high-angle grain boundary that migrates from the coated surface of the superalloy into its interior in a process that converts the fine Y/Y' microstructure into a coarse, and much weaker, microstructure of Y and TCP phases in a matrix of Y'. A particularly notable superalloy prone to SRZ is commercially known as MX4, a high-refractory, fourth generation single-crystal superalloy disclosed in commonly-assigned U.S. Pat. No. 5,482,789. Though the MX4 superalloy exhibits superior intrinsic strength relative to earlier-generation single-crystal superalloys, MX4 superalloy articles coated with an aluminum-containing coating are prone to SRZ formation and growth during elevated temperature service, thereby effectively reducing the load-bearing capacity of the alloy as well as likely causing a debit in fatigue life. Coating-induced SRZ formation in other superalloys has been successfully controlled through heat treatments and careful control of pre-coat surface preparation. However, such heat treatments and processing controls have been found to be insufficient in preventing SRZ in the MX4 alloy, presumably due to its very high refractory metal content and particularly its rhenium content (about 4.5 to about 5.75 weight percent). Other alloys with similar refractory metal contents are also believed to be prone to SRZ.

In view of the above, there has been an ongoing effort to develop coating systems that substantially reduce or eliminate the formation of SRZ in high-refractory alloys, as well as provide a suitable bond coat for TBC adherence and a suitable environmental coating for surfaces not coated by a TBC. One result of the development effort has been the formulation of diffusion barrier layers, as disclosed in commonly-assigned U.S. Pat. No. 6,306,524 to Spitsberg et al. Coating alloys taught by Spitsberg et al. contain ruthenium, optionally chromium, with the balance nickel or cobalt, and are deposited so as to be between the substrate and an aluminum-containing coating deposited on the substrate. Commonly-assigned and co-pending U.S. patent application Ser. Nos. 09/681,821 and 09/683,700 to Zhao et al. disclose ruthenium-containing diffusion barrier compositions that are believed to exhibit improved oxidation resistance and resistance to solid-state diffusion of aluminum and other elements between a superalloy substrate and a coating applied to protect the substrate. In addition to ruthenium, the coatings disclosed by the Zhao et al. applications may contain aluminum, chromium, and the base element of the superalloy (nickel, cobalt, or iron). Ser. No. 09/683,800 to Zhao et al. teaches that the disclosed ruthenium-containing barrier coating addresses the problem of SRZ formation in superalloys, including those containing significant additions of refractory elements such as tungsten, rhenium, tantalum, hafnium, molybdenum, niobium, and zirconium.

It would be desirable if improvements in the reduction of SRZ formation and growth could be achieved with superalloys that are especially prone to SRZ as a result of containing high levels of refractory elements, particularly those alloys containing more than three weight percent rhenium, e.g., the MX4 alloy. Such improvements would preferably be achieved with a coating system that can also provide a suitable bond coat for TBC adherence or a suitable environmental coating for surfaces not coated by a TBC.

SUMMARY OF INVENTION

The present invention provides a coating system for an article comprising a substrate formed of a metal alloy that is prone to the formation of SRZ as a result of containing more than three weight percent rhenium, especially rhenium contents of four weight percent or more, and at least one refractory metal selected from the group consisting of tungsten, tantalum, hafnium, molybdenum, niobium, and zirconium. The coating system comprises an aluminum-containing overlay coating and a diffusion barrier coating between the overlay coating and the substrate. The diffusion barrier coating consists of, in atomic percent, about 20% to about 90% ruthenium, about 2% to about 60% chromium, optionally up to about 50% aluminum, optionally up to about 20% of a platinum-group metal, and the balance at least one of nickel, cobalt, and iron and incidental impurities. The diffusion barrier coating sufficiently inhibits diffusion of aluminum from the overlay coating into the substrate, such that the substrate remains essentially free of SRZ that would be deleterious to the mechanical properties of the alloy.

A significant advantage of this invention is that the diffusion barrier layer reduces SRZ formation and growth in high-refractory superalloys that are especially prone to SRZ, such as the MX4 alloy (4.5 to 5.75 wt. % Re). The barrier layer is also potentially effective against extensive TCP. Furthermore, the coating system makes use of an aluminum-containing overlay coating that is compatible with the diffusion barrier layer, and is suitable for use as a bond coat for TBC adherence or as an environmental coating for surfaces not coated by a TBC. The barrier layer of this invention is also able to maintain the aluminum reservoir of the overlay coating for oxidation resistance, and may permit the use of a lower aluminum level in the overlay coating to achieve improved coating properties, such as toughness or ductility.

Other objects and advantages of this invention will be better appreciated from the following detailed description.

DETAILED DESCRIPTION

Figure 1:
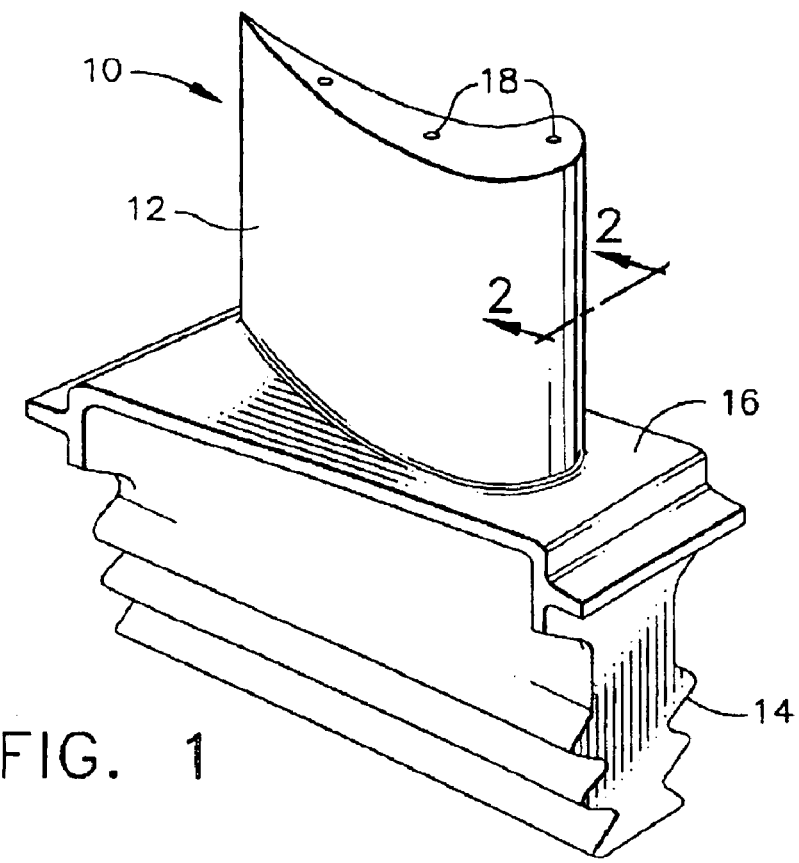
FIG. 1 is a perspective view of a high pressure turbine blade.

The present invention is generally applicable to components that operate within environments characterized by relatively high temperatures, and are therefore subjected to severe thermal stresses and thermal cycling. Notable examples of such components include the high and low pressure turbine nozzles and blades, shrouds, combustor liners and augmentor hardware of gas turbine engines. An example of a high pressure turbine blade 10 is shown in FIG. 1. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. Cooling passages 18 are present in the airfoil 12 through which bleed air is forced to transfer heat from the blade 10. While the advantages of this invention will be described with reference to components of a gas turbine engine, such as the high pressure turbine blade 10 shown in FIG. 1, the teachings of this invention are generally applicable to any component on which an aluminum-containing coating is used to protect a substrate formed of a metal alloy that is prone to the formation of SRZ.

Figure 2:
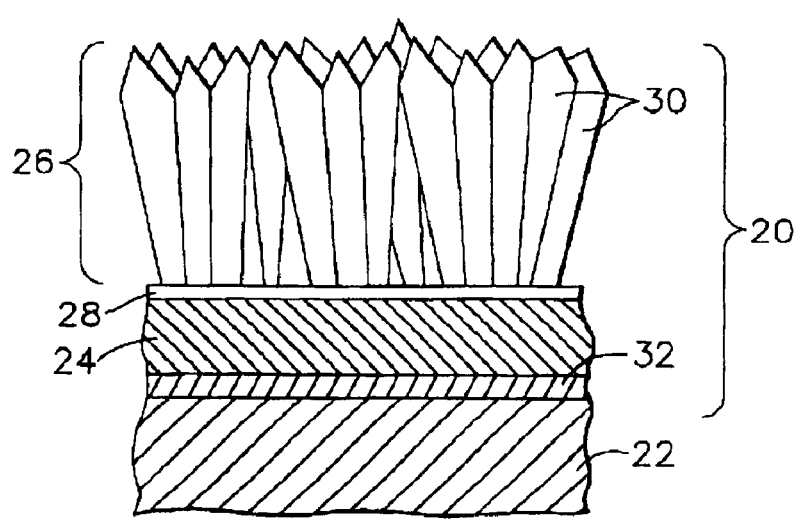
FIG. 2 is a cross-sectional representation of a TBC system on a surface region of the blade of FIG. 1, and depicts a coating system in accordance with an embodiment of this invention.

Represented in FIG. 2 is a surface region of the blade 10 that is protected by a coating system 20 in accordance with an embodiment of the present invention. As shown, the coating system 20 includes a bond coat 24 overlying a superalloy substrate 22, which is typically the base material of the blade 10. The bond coat 24 is shown as adhering a thermal-insulating ceramic layer 26, or TBC, to the substrate 22. Suitable materials for the substrate 22 (and therefore the blade 10) include equiaxed, directionally-solidified and single-crystal nickel-base superalloys, with the invention being especially advantageous for single-crystal superalloys that contain more than three weight percent rhenium, particularly at least four weight percent rhenium, and at least one additional refractory metal (e.g., tungsten, tantalum, hafnium, molybdenum, niobium, and zirconium). A notable example of such an alloy is the single-crystal nickel-base superalloy known as MX4 disclosed in U.S. Pat. No. 5,482,789. This superalloy nominally contains, by weight, about 0.4% to about 6.5% ruthenium, about 4.5% to about 5.75% rhenium, about 5.8% to about 10.7% tantalum, about 4.25% to about 17.0% cobalt, up to about 0.05% hafnium, up to about 0.06% carbon, up to about 0.01% boron, up to about 0.02% yttrium, about 0.9% to about 2.0% molybdenum, about 1.25% to about 6.0% chromium, up to about 1.0% niobium, about 5.0% to about 6.6% aluminum, up to about 1.0% titanium, about 3.0% to about 7.5% tungsten, a molybdenum+chromium+niobium content of about 2.15% to about 9.0%, an aluminum+titanium+tungsten of about 8.0% to about 15.1%, and the balance nickel and incidental impurities. Other notable examples of high-refractory superalloys include single-crystal superalloys commercially known under the names René N6 (U.S. Pat. No. 5,455,120; 5.1–5.6 wt. % Re), CMSX-10 (5–7 wt. % Re), and CMSX-12 (about 5.3 wt. % Re), each of which is of interest to the present invention as a result of having the potential for being prone to SRZ.

As is typical with TBC systems for components of gas turbine engines, the bond coat 24 is an aluminum-rich composition. In the present invention, the bond coat 24 is preferably an MCrAlX overlay coating or a beta-phase NiAl intermetallic overlay coating. Suitable beta-phase NiAl intermetallic overlay coatings are disclosed in U.S. Pat. Nos. 6,153,313, 6,255,001, and 6,291,084, with preferred coatings containing, in atomic percent, about 30% to about 60% aluminum, optionally up to about 10% chromium, about 0.1% to about 1.2% of a reactive element such as zirconium and/or hafnium, optional additions of silicon and/or titanium, the balance essentially nickel. Preferred MCrAlX overlay coatings contain, in atomic percent, about 10% to about 40% aluminum, 10% to about 25% chromium, 0.2% to about 3% yttrium, and the balance essentially at least one of nickel, cobalt, and iron. The bond coat 24 can be deposited by various physical vapor deposition (PVD) processes, including cathodic arc physical vapor deposition, electron beam-physical vapor deposition (EBPVD), and ion plasma deposition (IPD).

Aluminum-rich bond coats of the types described above naturally develop an aluminum oxide (alumina) scale 28, which can be more rapidly grown by forced oxidation of the bond coat 24. The ceramic layer 26 is chemically bonded to the bond coat 24 with the oxide scale 28. As shown, the ceramic layer 26 has a strain-tolerant columnar grain structure achieved by depositing the ceramic layer 26 using a physical vapor deposition technique known in the art (e.g., EBPVD), though a plasma spray technique could be used to deposit a noncolumnar ceramic layer. A preferred material for the ceramic layer 26 is an yttria-stabilized zirconia (YSZ), a preferred composition being about 6 to about 8 weight percent yttria, optionally with up to about 20 weight percent of an oxide of a lanthanide-series element to reduce thermal conductivity. Other ceramic materials could be used for the ceramic layer 26, such as yttria, nonstabilized zirconia, or zirconia stabilized by magnesia, ceria, scandia, and/or other oxides. The ceramic layer 26 is deposited to a thickness that is sufficient to provide the required thermal protection for the underlying substrate 22 and blade 10, generally on the order of about 75 to about 300 micrometers.

While described in reference to a coating system 20 that includes a ceramic layer (TBC) 26, the present invention is also applicable to coating systems that include an oxidation-resistant aluminum-containing coating, but not a ceramic layer. In such an embodiment, the aluminum-containing coating is termed an environmental coating, and preferably has a composition identical to either the betaphase NiAl overlay coating or the MCrAlX overlay coating described above for the bond coat 24, though platinum aluminide (PtAl) environmental coatings are also within the scope of the invention.

Notably, as an overlay coating, the bond coat 24 forms a limited diffusion zone in the surface of the substrate 22. However, over time at elevated temperatures, a diffusion zone nonetheless develops comprising various intermetallic and metastable phases that form as a result of diffusional gradients and changes in elemental solubility in the local region of the substrate 22. If its formation is not inhibited, such a diffusion zone can result in the formation of SRZ that contains detrimental TCP phases as a result of the high-refractory superalloy material of the substrate 22. In particular, refractory elements such as rhenium, tungsten, tantalum, hafnium, molybdenum, niobium, and zirconium are components of deleterious TCP phases that form if these elements (particularly rhenium, tungsten, and/or tantalum) are present in sufficient amounts or combinations. These deleterious phases are characterized by plate-like or needle-like phases (such as $\sigma$, $\mu$, $\chi$, etc.) within a gamma envelope and separated from the unaffected alloy substrate by a high angle grain boundary, with the effect that rupture strength, ductility and fatigue resistance of the alloy are reduced.

According to this invention, the bond coat 24 is separated from the substrate 22 by a diffusion barrier layer 32, which is preferably deposited directly on the surface of the substrate 22. The diffusion barrier layer 32 is formed of an alloy that is slow-diffusing, exhibits little interdiffusion or interaction with the substrate 22 during elevated-temperature exposures, and inhibits the interdiffusion of constituents between the substrate 22 and bond coat 24, such as aluminum that tends to diffuse into the superalloy substrate 22 from the bond coat 24 and elements whose diffusion can lead to TCP formation. In so doing, the barrier layer 32 inhibits the formation in the substrate 22 of an SRZ and deleterious TCP-phases associated therewith, and potentially reduces the risk of extensive TCP as well.

The diffusion barrier layer 32 preferably has a thickness of at least about five micrometers, preferably about ten to about fifteen micrometers. A suitable composition for the diffusion barrier coating is, in atomic percent, about 20% to about 90% ruthenium, about 2% to about 60% chromium, optionally up to about 50% aluminum, and the balance essentially nickel, cobalt, iron, and combinations thereof. Optionally up to about 20% of a platinum-group metal may be included in the barrier layer 32 to promote its oxidation resistance. A more preferred composition for the diffusion barrier coating is, in atomic percent, about 30% to about 80% ruthenium, about 5% to about 12% chromium, about 4% to about 10% aluminum, and the balance nickel and incidental impurities. As taught in U.S. patent application Ser. No. 09/683,700, the presence of ruthenium in the diffusion barrier layer 32 provides good diffusion barrier properties and oxidation resistance, while the presence of aluminum and chromium further enhances the oxidation resistance of the barrier layer 32. The presence of nickel and/or cobalt in the barrier layer 32 enhances its compatibility with superalloy substrates in terms of properties such as, for example, thermal expansion coefficient. The diffusion barrier layer 32 can be formed by various overlay coating processes, including EBPVD, IPD and cathodic arc physical vapor deposition, as well as plating techniques.

In an investigation leading to the present invention, coatings in accordance with the foregoing discussion were deposited on test coupons and subsequently tested under cyclic thermal exposure. The test coupons were single-crystal buttons formed of the MX4 superalloy to have diameters of about one inch (about 2.5 cm) and thicknesses of about one-eighth inch (about 3 mm). Baseline specimens were prepared by coating some of the MX4 coupons with beta-phase NiAl intermetallic overlay coatings deposited by EBPVD and IPD to thicknesses of about 50 micrometers. The overlay coatings had the following nominal composition (atomic percent): about 45% Al, about 8% Cr, about 1.3% Zr, and about 45.7% Ni. Coating systems prepared in accordance with this invention included a diffusion barrier layer deposited directly on the coupons, on which were deposited overlaying coatings having the same composition and thickness as that of the baseline specimens. The barrier layers were deposited by cathodic arc deposition using a current of about 70 amperes, and had the following nominal composition (atomic percent) and thickness: about 43.2% Ru, about 8.6% Cr, about 5% Al, and about 43.2% Ni; with thicknesses of about 12 micrometers. Finally, TBC having a columnar microstructure was deposited directly on the overlay coatings of some coupons of each test group. The TBC had a composition of zirconia partially stabilized by about 7 eight percent yttria-stabilized zirconia, and was deposited by EBPVD to a thickness of about five mils (about 125 micrometers).

Figure 3:
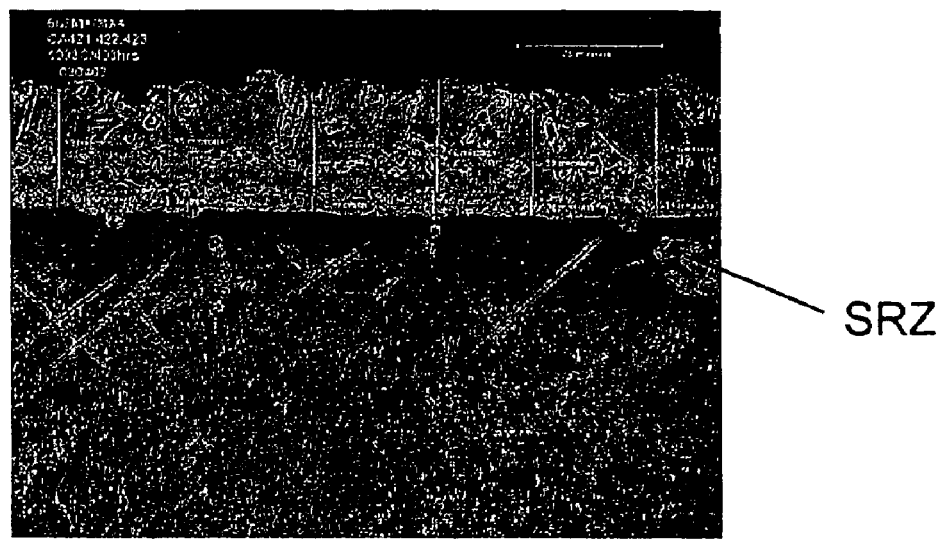
FIG. 3 is scanned cross-sectional image of a substrate region of an MX4 superalloy protected with an environmental coating following an extended high temperature exposure (400 hrs. at 2000° F.), and evidences the substantial absence of SRZ in the surface of the substrate region as a result of a diffusion barrier layer between the coating and substrate in accordance with this invention.
Figure 4:
FIG. 4 is a scanned cross-sectional image of a substrate region of an MX4 superalloy protected with an environmental coating following an extended high temperature exposure (400 hrs. at 2000° F.), and evidences the formation of SRZ in the surface of the substrate region.

Several of the TBC-free coupons of each test group (baseline and experimental) were exposed to about 2000° F. (about 1090° C.) for about 400 hours in an air environment to assess the tendency for SRZ formation. Following this test, the coupons were sectioned and polished for metallographic viewing. FIG. 3 is a cross-sectional image of the near-surface region of a coupon protected by the combined overlay coating and diffusion barrier of this invention, while FIG. 4 is an equivalent image of a coupon protected only by an overlay coating. The tested specimens evidenced that both coating systems were able to protect the underlying MX4 substrate from oxidation. FIG. 3 further shows that the coupon protected with the coating system of this invention (overlay coating+diffusion barrier) formed a diffusion zone having a thickness of about 10 micrometers, beneath which only one small patch of SRZ is visible in the substrate (with less than 5% linear coverage). In contrast, the baseline specimen seen in FIG. 4 formed both a primary diffusion zone as well as an extensive SRZ zone, having a combined thickness of about 180 micrometers. Furthermore, the linear coverage of the SRZ in FIG. 4 is 100%.

TBC-coated coupons of each test group then underwent furnace cycle testing (FCT) to assess the relative TBC spallation performance between those specimens with the coating system of this invention and the baseline specimens with only the NiAl overlay coating. The test was conducted with one-hour cycles between room temperature and about 2125° F. (about 1163° C.), with a dwell time of about forty-five minutes at peak temperature. Testing of a given specimen was terminated when about 20% of the TBC has spalled. The average FCT life for each group of specimens was about 475 cycles. Based on standard deviations, FCT lives for the baseline specimens and the specimens of this invention were +/−110 and +/−210 cycles, respectively. From this test, it was concluded that no statistical difference in the TBC spallation lives was observed.

The above tests demonstrated the ability of the coating system of this invention to prevent or at least significantly reduce the formation of SRZ in the MX4 alloy, while still providing environmental oxidation protection and TBC spallation life. Based on these results, it is believed that a particularly preferred composition for the diffusion barrier layer of this invention is, in atomic percent, about 40% to about 60% ruthenium, about 5% to about 12% chromium, about 4% to about 10% aluminum, and the balance nickel and incidental impurities.

While the invention has been described in terms of particular embodiments, it is apparent that other forms could be adopted by one skilled in the art. Therefore, the scope of the invention is to be limited only by the following claims.

What is claimed is:

1. An article comprising a substrate and a coating system on a surface of the substrate, the substrate being formed of a metal alloy containing more than 3 weight percent rhenium and at least one refractory metal selected from the group consisting of tungsten, tantalum, hafnium, molybdenum, niobium, and zirconium, the coating system comprising an aluminum-containing overlay coating and a diffusion barrier coating between the overlay coating and the substrate, the diffusion barrier coating consisting of, in atomic percent, about 20% to about 90% ruthenium, about 2% to about 60% chromium, optionally up to about 50% aluminum, optionally up to about 20% of a platinum-group metal, and the balance essentially at least one of nickel, cobalt, and iron, the substrate being essentially free of a secondary reaction zone that is deleterious to the mechanical properties of the metal alloy.

2. The article according to claim 1, wherein the overlay coating comprises a metallic solid solution containing intermetallic phases, and has a composition of MCrAlX, where M is iron, cobalt and/or nickel, and X is at least one rare earth element.

3. The article according to claim 2, wherein the overlay coating contains, in atomic percent, about 10% to about 40% aluminum, 10% to about 25% chromium, 0.2% to about 3% yttrium, and the balance essentially at least one of nickel, cobalt, and iron.

4. The article according to claim 1, wherein the overlay coating consists essentially of intermetallic phases.

5. The article according to claim 4, wherein the overlay coating contains, in atomic percent, about 30% to about 60% aluminum, optionally up to about 10% chromium, 0.1% to about 1.2% of at least one element chosen from the group consisting of zirconium, hafnium, silicon, and titanium, the balance being essentially nickel.

6. The article according to claim 1, further comprising a ceramic coating on the overlay coating.

7. The article according to claim 6, wherein the ceramic coating contains yttria-stabilized zirconia.

8. The article according to claim 7, wherein the ceramic coating contains about 7 to about 8 weight percent yttria.

9. The article according to claim 6, wherein the ceramic coating further contains an oxide of a lanthanide-series element.

10. The article according to claim 1, wherein the metal alloy of the substrate is a superalloy containing at least four weight percent rhenium.

11. The article according to claim 1, wherein the diffusion barrier coating consists of, in atomic percent, about 30% to about 80% ruthenium, about 2% to about 12% chromium, about 4% to about 10% aluminum, optionally up to about 20% of a platinum-group metal, and the balance nickel and/or cobalt and incidental impurities.

12. The article according to claim 1, wherein the article is a gas turbine engine component.

13. A gas turbine engine component comprising a substrate and a coating system on a surface of the substrate, the substrate being formed of a nickel-base superalloy containing about 4.5 to about 5.75 weight percent rhenium and at least one refractory metal selected from the group consisting of tungsten, tantalum, hafnium, molybdenum, niobium, and zirconium, the coating system comprising:

a diffusion barrier coating on the substrate and consisting of, in atomic percent, 30% to 80% ruthenium, 2% to 12% chromium, about 4% to about 10% aluminum, optionally up to 20% of a platinum-group metal, and the balance being nickel and/or cobalt and incidental impurities; and an overlay coating on the diffusion barrier coating and consisting essentially of intermetallic phases and containing, in atomic percent, 30% to 60% aluminum, optionally up to 10% chromium, 0.1% to 1.2% of at least one element chosen from the group consisting of zirconium, hafnium, silicon, and titanium, the balance being essentially nickel;

wherein the diffusion barrier coating inhibits diffusion of aluminum from the overlay coating into the substrate so that the substrate is essentially free of a secondary reaction zone that is deleterious to the mechanical properties of the superalloy.

14. The gas turbine engine component according to claim 13, further comprising a ceramic coating on the overlay coating.

15. The gas turbine engine component according to claim 14, wherein the ceramic coating contains yttria-stabilized zirconia.

16. The gas turbine engine component according to claim 15, wherein the ceramic coating further contains an oxide of a lanthanide-series element.

17. The gas turbine engine component according to claim 13, wherein the superalloy of the substrate consists of, by weight, 0.4% to 6.5% ruthenium, 4.5% to 5.75% rhenium, 5.8% to 10.7% tantalum, 4.25% to 17.0% cobalt, up to 0.05% hafnium, up to 0.06% carbon, up to 0.01% boron, up to 0.02% yttrium, 0.9% to 2.0% molybdenum, 1.25% to 6.0% chromium, up to 1.0% niobium, 5.0% to 6.6% aluminum, up to 1.0% titanium, 3.0% to 7.5% tungsten, and wherein the sum of molybdenum plus chromium plus niobium is 2.15% to 9.0%, and wherein the sum of aluminum plus titanium plus tungsten is 8.0% to 15.1%, the balance nickel and incidental impurities.

18. The gas turbine engine component according to claim 17, wherein the diffusion barrier coating consists of, in atomic percent, 40% to 60% ruthenium, 5% to 12% chromium, 4% to 8% aluminum, and the balance nickel and/or cobalt and incidental impurities.

19. The gas turbine engine component according to claim 13, wherein the diffusion barrier coating consists of, in atomic percent, 40% to 60% ruthenium, 5% to 12% chromium, 4% to 8% aluminum, and the balance nickel and/or cobalt and incidental impurities.

20. The gas turbine engine component according to claim 13, wherein the diffusion barrier coating consists of, in atomic percent, about 43% ruthenium, about 9% chromium, about 5% aluminum, and the balance nickel and incidental impurities.

* * * * *